United States Patent [19]
Shoquist

[11] Patent Number: 5,785,330
[45] Date of Patent: Jul. 28, 1998

[54] TRAILER SUPPORT WHEEL ASSEMBLY

[76] Inventor: William A. Shoquist, 14815 Oakland Beach Ave., Prior Lake, Minn. 55372

[21] Appl. No.: 741,188

[22] Filed: Oct. 29, 1996

[51] Int. Cl.⁶ .................................................. B62D 13/00
[52] U.S. Cl. ........................... 280/81.6; 280/82; 280/85; 280/475
[58] Field of Search .................. 280/81.6, 82, 83, 280/84, 85, 475

[56] References Cited

U.S. PATENT DOCUMENTS

| Re. 32,736 | 8/1988 | Lovell | 280/840 |
|---|---|---|---|
| 1,106,742 | 8/1914 | Smethers | 280/85 |
| 1,731,707 | 10/1929 | Coultas et al. | 280/82 |
| 2,033,298 | 3/1936 | Pribil | 280/78 |
| 2,309,204 | 1/1943 | Nelson | 280/85 |
| 2,331,006 | 10/1943 | Suttles | 280/82 |
| 2,446,321 | 8/1948 | Bartholomew | 280/475 |
| 2,568,261 | 9/1951 | Stade | 280/405.1 |
| 2,852,266 | 9/1958 | Wagner | 280/40 |
| 5,087,063 | 2/1992 | Merrill, Jr. | 28/475 |
| 5,465,993 | 11/1995 | Gee et al. | 280/745 |

FOREIGN PATENT DOCUMENTS

| 621873 | 5/1927 | France . |
|---|---|---|
| 1,303,991 | 8/1962 | France . |
| 155648 | 3/1932 | Switzerland . |
| 723758 | 2/1955 | United Kingdom . |

*Primary Examiner*—Kenneth R. Rice
*Attorney, Agent, or Firm*—Palmatier, Sjoquist, Voigt & Christensen, P.A.

[57] ABSTRACT

A trailer support wheel assembly having a wishbone frame pivotally connected to the trailer frame at two rear mounting points and adjustably connected to the trailer frame at a single forward point. A resilient suspension assembly and spindle is contained by the wishbone frame assembly, and the spindle is further connected to one or more wheels which may be lowered into contact with the ground. The wishbone frame assembly may be adjustably positioned to permit the wheels to carry a greater or lesser load portion of the trailer as it is connected to a vehicle.

19 Claims, 4 Drawing Sheets

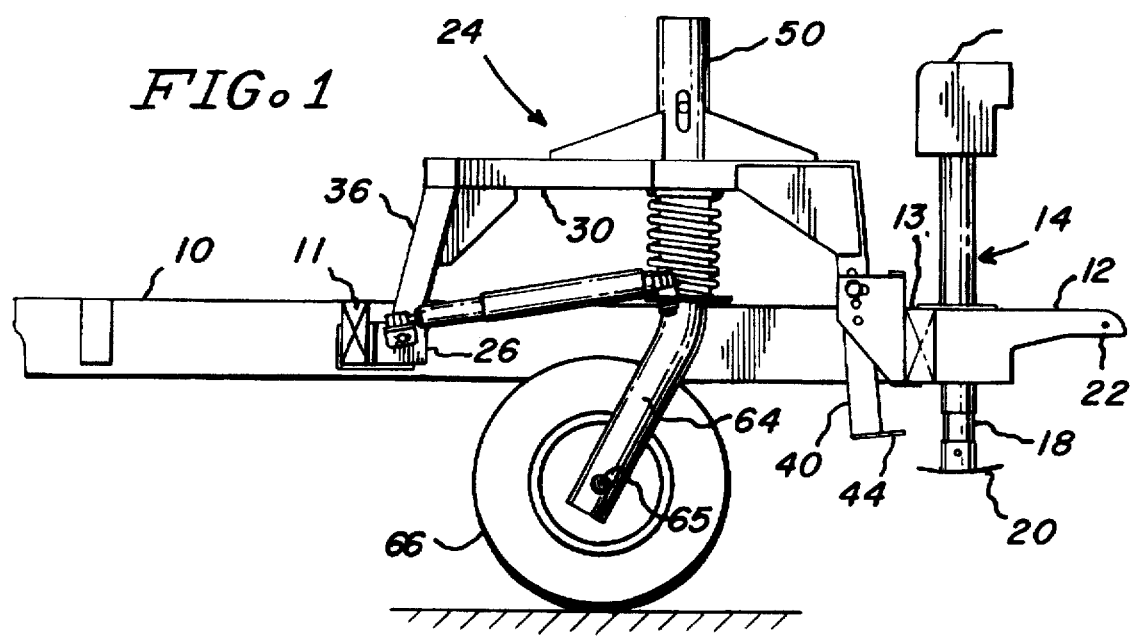
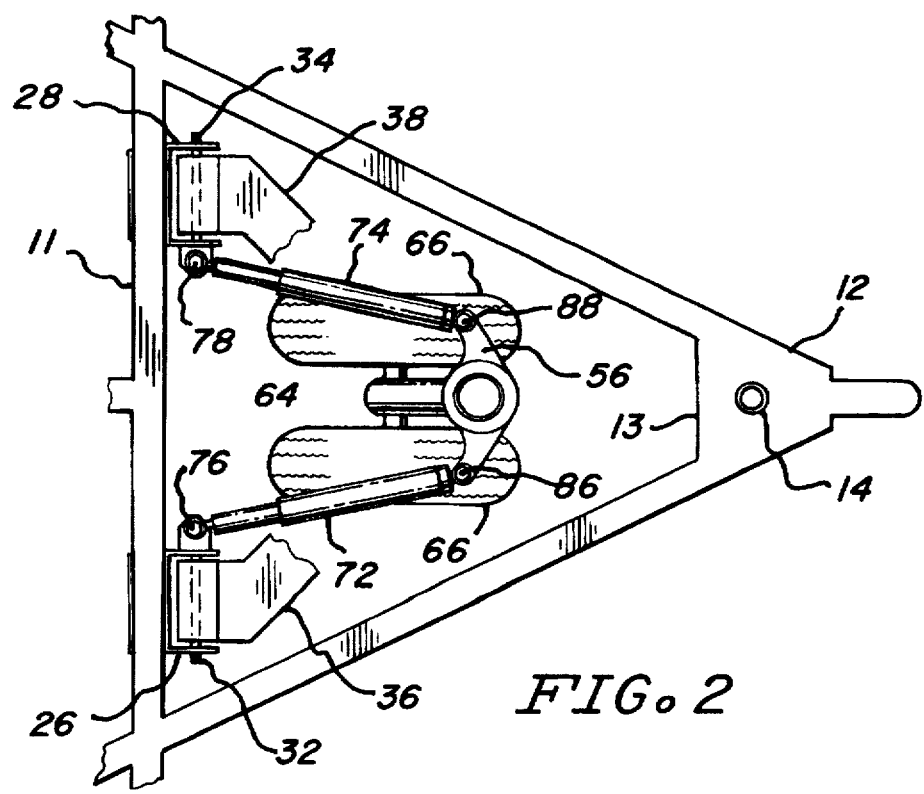

TRAILER SUPPORT WHEEL ASSEMBLY

BACKGROUND OF THE INVENTION

This invention relates to an improvement in the load-carrying capacity of a vehicle connected to a trailer. Specifically, the invention relates to a wheeled assembly which is connected near the front of a trailer to relieve some of the loading effects on the trailer hitch which is connected to the towing vehicle.

There is a related application, Ser. No. 08/496,134, filed Jun. 28, 1995, which discloses an alternative embodiment for a trailer-loading support.

Trailers intended for towing behind relatively light-weight vehicles are becoming increasingly heavy as the loads become ever larger. Such trailers may be used for transporting boats, construction equipment, other vehicles, motor homes, and animals. All such trailers are typically connected to the towing vehicle by a ball trailer hitch, wherein the forward tongue of the trailer is formed into a ball receiver and the ball is connected to the vehicle either directly or by a subframe assembly. Optimally, the trailer loading effect on the vehicle is balanced so that the load on the motor vehicle is no greater than approximately 350–500 pounds; the balance of the trailer weight being carried by the trailer wheels. The downward force on the towing vehicle via the trailer ball is called the tongue weight, and this tongue weight creates an additional load on the suspension of the motor vehicle which can become dangerous at excessive loading levels. Motor vehicles typically have a maximum limit prescribed for the vehicle and increasing the loading effect beyond the prescribed maximum may result in unsafe performance of the motor vehicle, both from the standpoint of stressing the motor vehicle's suspension and also by way of reducing the traction of the front wheels of the vehicle.

The present invention provides an apparatus for relieving the loading conditions on a motor vehicle by providing an adjustable wheeled assembly to carry a sufficient portion of the trailer tongue weight so as to provide a balanced load condition for the towing vehicle and for the towed trailer.

SUMMARY OF THE INVENTION

The present invention comprises a wheeled assembly which is pivotally connected to a trailer frame at one of its ends and is adjustably connected to the trailer frame at another of its ends. A resiliently mounted spindle is mounted proximate the center of the wheel assembly and supports one or more wheels which bear on the road surface to partially carry the front load of the trailer. The adjustable connection of the wheel assembly permits adjustment of the relative load-carrying capacity of the wheeled assembly. The spindle which supports the wheels is rotatable to permit the wheels to turn in the direction of movement of the trailer and one or more steering dampeners are provided to control the rate of turning of the spindle.

It is the principal object of the present invention to provide a wheel assembly for carrying a portion of the tongue weight of a trailer.

It is another object and advantage of the invention to provide a wheel assembly for carrying tongue weight of trailer and being steerable to move in the direction of motion of the trailer.

It is a further object and advantage of the invention to provide a trailer support wheel assembly which is adjustable for carrying multiple trailer tongue weight portions.

It is another object of the invention to provide a wheeled assembly which may be readily connected and adjusted by utilizing the conventional trailer jack which is typically found on a trailer tongue assembly.

Other and further objects and advantages of the invention will become apparent from the following specification and claims and with reference to the appended drawings.

BRIEF DESCRIPTION OF THE DRAWINGS

FIG. 1 shows an elevation view, in partial breakaway, of the trailer support wheel assembly connected to a trailer;

FIG. 2 shows a partial top view of the invention connected to a trailer frame;

DESCRIPTION OF THE PREFERRED EMBODIMENT

Figure 3:
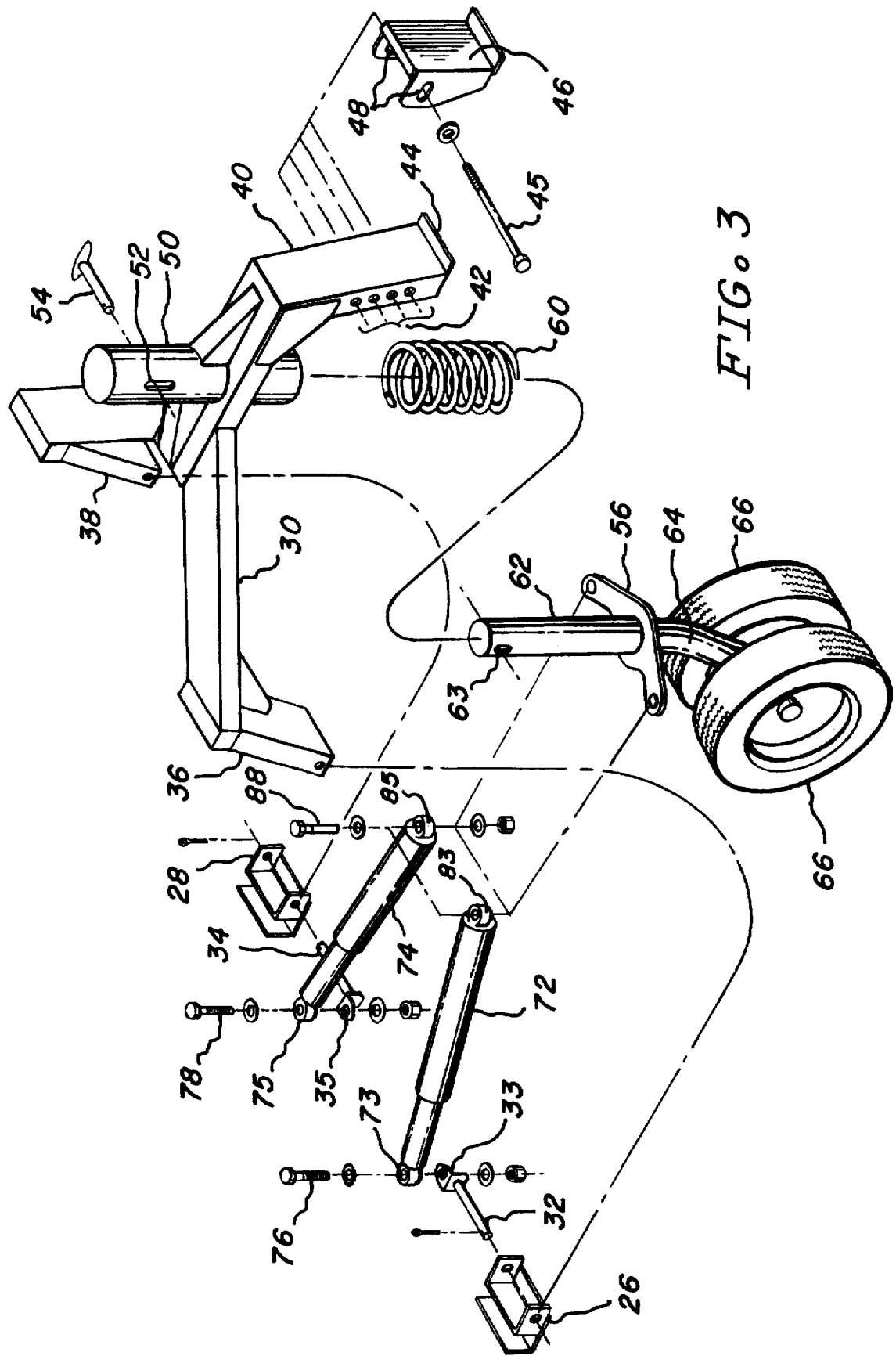
FIG. 3 shows a drawing of the invention in exploded view.

FIG. 1 shows the invention in elevation view connected to a trailer frame 10 which is shown in partial cut-away view. Trailer frame 10 has a forwardly-extending tongue 12 with a ball receiver 22 at its forwardmost end. A trailer jack 14 is affixed proximate the front of tongue 12. The jack 14 has a motor drive or crank mechanism 16 which movably positions a jack shaft 18 upwardly or downwardly. Jack shaft 18 has a foot pad 20 which can be extended to contact the ground surface. Trailer frame 10 has a cross-frame member 11 and a cross-frame member 13 for strengthening the frame assembly.

Referring to FIGS. 1–4, a wheel assembly 24 is pivotally and adjustably connected to trailer frame 10. A pair of U-brackets 26, 28 are affixed to cross-frame member 11 by bolts or weldments. Each U-bracket 26, 28 has a pair of aligned holes through the respective brackets, the holes being sized to accept hinge pins 32, 34. A wishbone frame 30 has a pair of downwardly depending frame sections 36, 38 having aligned holes through their respective ends; hinge pins 32, 34 respectively pivotally connect frame sections 36, 38 to brackets 26, 28. These connections permit wheel assembly 24 to pivot about the axis of alignment of hinge pins 32 and 34.

The front end of wishbone frame 30 is formed into a downwardly directed frame section 40 having a plurality of aligned holes 42 at spaced apart intervals along its length. The lower end of frame section 40 has a forwardly projecting tab 44 which will be hereinafter described. A vertical cylinder 50 is affixed to wishbone frame 30 proximate its center and cylinder 50 has a pair of aligned slots 52 passing therethrough. A linch pin 54 is sized to insert through the slots 52.

A front bracket 46 is affixed to cross frame member 13 by bolts or weldment. Front bracket 46 has a pair of elongate slots 48 through its respective side walls in aligned relationship. A bolt 45 is sized to fit through elongate slots 48 and also to fit through holes 42 in frame section 40.

A compression spring 60 is fitted over the exterior of cylinder 50 and a spindle 62 is fitted into the interior of cylinder 50. Spindle 62 has a pair of elongate slots 63 proximate its upper end and elongate slots 63 are sized to accept linch pin 54. Spindle 62 has a curved lower end 64 with an axle connection 65 proximate its lower extremity.

Axle connection 65 is adapted to receive an axle which passes through the wheel hubs for wheels 66. A turning arm 56 is affixed to spindle 62, and turning arm 56 is rotatable with spindle 62 about the vertical axis of spindle 62.

A pair of L-brackets 33, 35 are each respectively connected to an inner end of hinge pin 32, 34. A pair of steering dampers 72, 74 each have respective ends 73, 75 connected to L-brackets 33, 35 by means of threaded fasteners 76, 78. The respective other ends 83, 85 of steering dampers 72, 74 are connected to turning arm 56 by similar threaded fasteners, 86, 88. Steering dampers 72, 74 are conventional dashpot-type cylinders typically having air as the damping medium. Each of the steering dampener ends 73, 75, 83, 85 have a rubber grommet for receiving the respective threaded fasteners. These rubber grommets permit a certain degree of lateral movement of the steering dampers relative to the brackets to which they are connected. A small amount of lateral movement is to be expected, as the wheel assembly 24 will move upwardly and downwardly as it encounters different types of road surfaces. Of course, an alternative and equivalent embodiment of this invention could utilize a single steering dampener connected as described instead of the two steering dampeners which are described with reference to the preferred embodiment.

Figure 4:
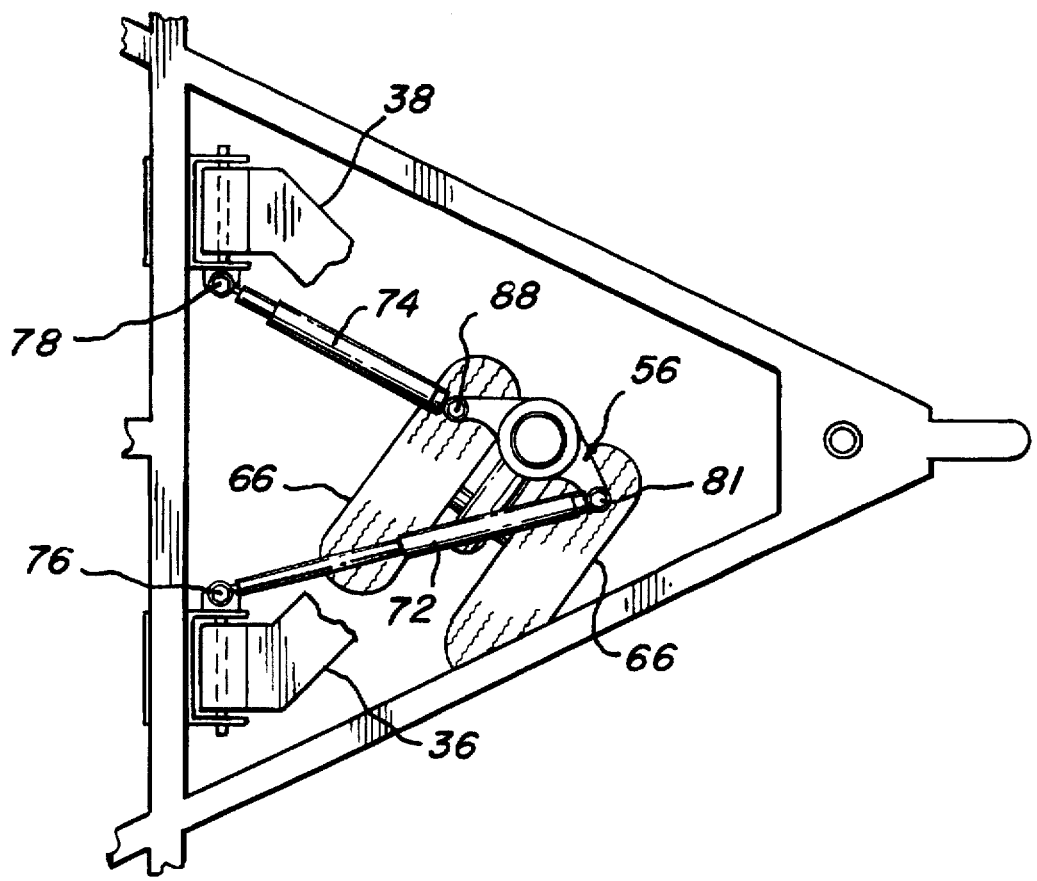
FIG. 4 shows a partial top view of the invention, illustrating the turning ability of the wheel assembly.

FIG. 4 shows a top view of the apparatus in partial breakaway to illustrate the turning mechanism associated with the wheels 66. In this example, the wheels as shown turn sharply to the left with turning arm 56 correspondingly turned to the left. Steering damper 74 is compressed as a result of its connection to turning arm 56 and steering damper 72 is extended as a result of this connection to turning arm 56. Since both steering damper 72 and steering damper 74 comprise cylinders and pistons having air in the cylinders, both steering dampers will resist sudden extension or retraction and will thereby dampen or slow the turning motion of wheels 66. This prevents any rapid oscillation or turning motions from taking place with respect to wheels 66 and controls the rate of turning under operating conditions.

In operation, the trailer jack 14 is extended to permit foot pad 20 to contact the ground; and the trailer jack is further extended to raise the ball receiver sufficiently to permit a vehicle trailer ball to be positioned beneath the ball receiver 22. Trailer jack 14 is then retracted until it disengages from contact with the ground, and the degree of loading of the trailer on the trailer hitch mechanism is assessed. Ideally, the trailer tongue should be positioned so as to have approximately a 17-inch clearance from the ground; and the trailer frame and vehicle frame should be relatively horizontal with respect to the ground. If the trailer hitch is overloaded, the trailer frame and vehicle frame will be relatively lowered and the trailer ball receiver will be less than 17 inches above the ground. In this case, the jack 14 is again activated to raise the trailer tongue and bolt 45 is inserted through one of the plurality of openings 42 through front section 40. To share a greater portion of the trailer load, front section 40 is raised to permit bolt 45 to pass through one of the lower holes in front section 40. After bolt 45 has been secured in the proper position, the trailer jack is again retracted to lower the entire assembly into contact with the ground so that the relative horizontal positions of the trailer frame and vehicle can be reassessed. This process is continued until the trailer frame is relatively horizontal to the ground and the trailer ball receiver 22 is approximately 17 inches above the surface of the ground.

For stowing the wheel assembly during periods of inoperation, the linch pin 54 may be inserted through slot 52 of cylinder 50 and slot 63 of spindle 62. This will lock the spindle and wheels into a fixed raised position relative to the wishbone frame 30. The forwardly projecting tab 44 on the front section 40 of wishbone frame 30 provides a safety mechanism in the event bolt 45 becomes disconnected or broken. In this situation, the front section 40 of wishbone frame 30 will tend to move upwardly in unconstrained fashion until tab 44 contacts the underside of cross frame member 13. This engagement will permit no further dropping of the trailer frame front end and will protect against a catastrophic failure.

The respective ends 73, 83 of damper 72 and 75, 85 of damper 74 will typically include a rubber grommet for facilitating the connection with the fasteners. The respective rubber grommets permit some lateral and longitudinal motion of the respective ends of the steering damper 72, 74 in a manner which is typically associated with the connection of shock absorbers and the like.

Figure 5:
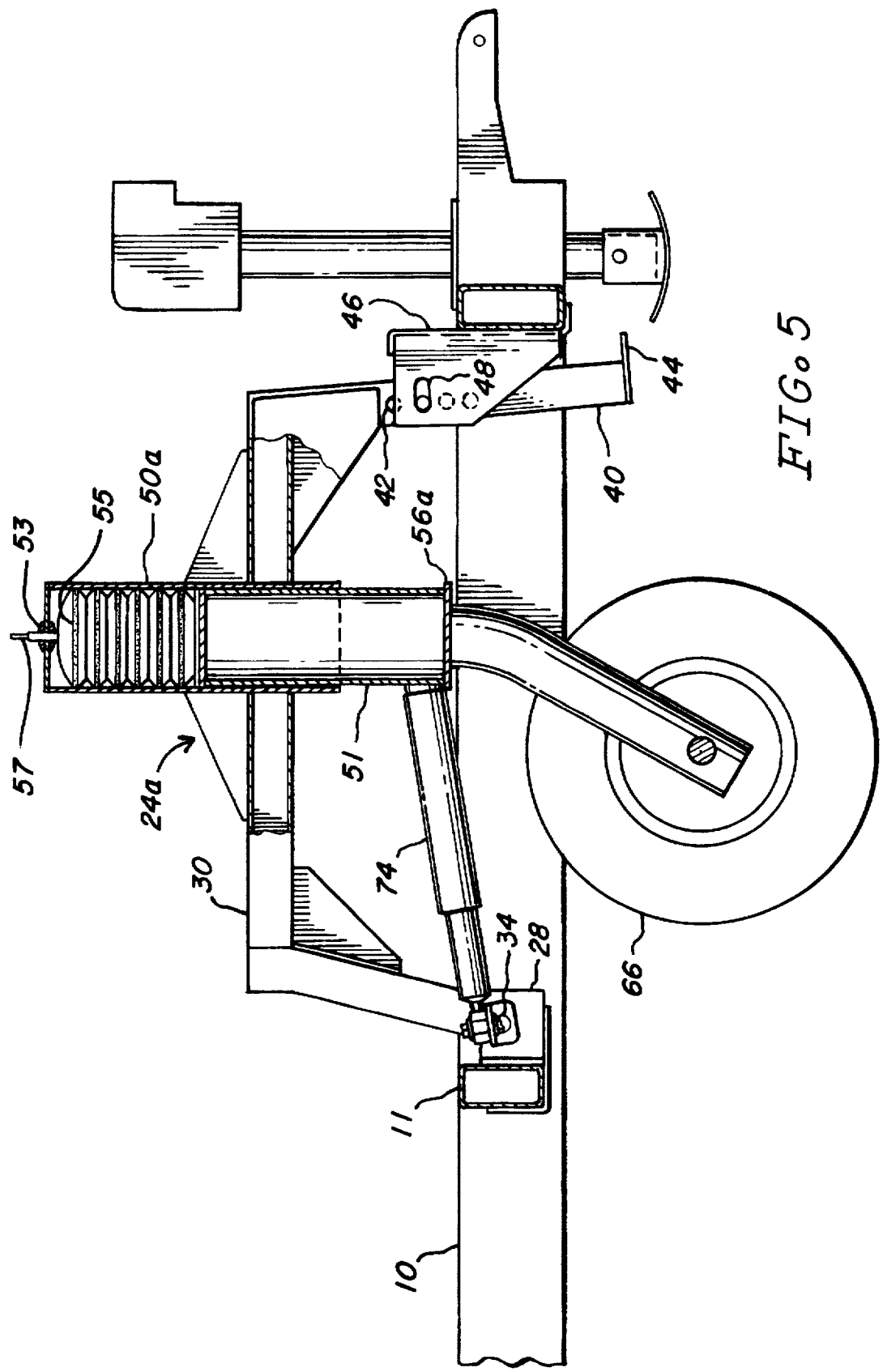
FIG. 5 shows an elevation view of an alternative suspension assembly.

FIG. 5 shows an alternative embodiment of the invention in elevation view and connected to a trailer frame 10, which is shown in partial cutaway view. A wheel assembly 24a is pivotally attached to a cross-frame member 11 at two points, as described earlier. A pair of U-brackets 26, 28 are affixed to cross-frame member 11 as described, and each U-bracket has a pair of aligned holes through the respective brackets which are sized to accept hinge pins 32, 34. The front portion of wheel assembly 24a has a downwardly-directed frame section 40 having a plurality of aligned holes 42, wherein each of the holes 42 may be selectively aligned with a slot in front bracket 46. A vertical cylinder 50a is affixed to the wishbone frame 30, and a piston 51 is slidably movable within the inside of cylinder 50a. Piston 51 has at least a closed top surface, and cylinder 50a has an open bottom end for permitting piston 51 to be accepted into cylinder 50a. An air bag 55 is placed in the space between the top surface of piston 51 and the undersurface of the top wall of cylinder 50a. An air valve 57 is attached to air bag 55 and projects through the top wall of cylinder 50a via sealable grommet 53. The air pressure into air bag 55 may, therefore, be selectively controlled by adding or removing air from the air bag via air valve 57. In operation, the compressible air bag serves as a resilient suspension means for controlling the loading effects on the wheel assembly 24a. The air bag is also able to absorb the shock of relative movement between 50 and 51 and cylinder 50a, as might be caused by operating the vehicle over a road surface. In all other respects, the apparatus disclosed in FIG. 5 is similar to the apparatus previously disclosed herein. Of course, other alternative embodiments may be devised to provide a similar operation to that described herein. For example, a torsion bar suspension assembly might be adapted to serve the functions described herein, or a combination of air and hydraulics might be used in connection with a piston/cylinder operation to achieve the same purpose.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A trailer support wheel assembly for attachment to cross frame struts of a trailer comprising:
   a) a wishbone-shaped frame having two rearward frame sections pivotally connectable to a first cross frame strut, and having a single forward frame section with a plurality of mounting points;

b) a forward mounting bracket connectable to a second cross frame strut at a position which permits engagement of said forward mounting bracket with said plurality of mounting points;

c) means for connecting said forward mounting bracket to said forward frame section at any of said plurality of mounting points;

d) a spindle rotatably connected to said wishbone-shaped frame about a proximate vertical axis, and at least one wheel rotatably connected to said spindle;

e) at least one steering dampener connected between said spindle and one of said cross frame struts; and f) a resilient suspension mounted between said wishbone-shaped frame and said spindle.

2. The apparatus of claim 1, wherein said means for connecting further comprises a mounting bolt connectable through said forward mounting bracket and any of said plurality of mounting points, wherein each of said plurality of mounting points comprise holes through said forward frame section.

3. The apparatus of claim 2, further comprising a turning arm fixedly connected to said spindle, and said at least one steering dampener having an end connected to said turning arm.

4. The apparatus of claim 3, wherein said at least one steering dampener further comprises two steering dampeners, each of said steering dampeners having one end pivotally connected to said turning arm and a second end pivotally connected to said first cross frame strut.

5. The apparatus of claim 3, further comprising a pair of U-brackets respectively affixed to said first cross frame strut, each U-bracket in alignment with a respective rearward frame section, and a hinge pin connecting each said U-bracket to one of said rearward frame sections.

6. The apparatus of claim 5, further comprising a cylinder affixed to said wishbone-shaped frame and aligned to receive an upper portion of said spindle.

7. The apparatus of claim 6, wherein said resilient suspension further comprises a compression spring.

8. The apparatus of claim 7, wherein said compression spring further comprises a coil spring having a first end mounted about said cylinder and having a second end contacting said turning arm.

9. The apparatus of claim 8, wherein said at least one wheel further comprises two wheels wherein each of said two wheels is rotatably connected on opposite sides of said spindle.

10. The apparatus of claim 9, further comprising alignable slots through each of said cylinder and said spindle, and a linch pin insertable through said slots to fixedly connect said spindle to said cylinder.

11. The apparatus of claim 6, wherein said resilient suspension further comprises a compressible air bag.

12. A trailer support wheel assembly for attachment to cross frame struts of a trailer, comprising:

a) a support frame for said wheel assembly, said support frame having means for pivotally connecting to one cross frame strut and means for adjustably connecting to a second cross frame strut, said support frame having an open ended cylinder mounted intermediate said means for pivotally connecting and said means for adjustably connecting;

b) a spindle having an upper end in said cylinder and having a lower end;

c) at least one wheel rotatably connected proximate said spindle lower end;

d) a turning arm affixed to said spindle; and e) at least one steering dampener connected between said turning arm and said support frame.

13. The apparatus of claim 12, wherein said support frame means for pivotally connecting to one cross frame strut further comprises a U-bracket fixably attachable to said one cross frame strut and a hinge pin connecting said U-bracket to said support frame.

14. The apparatus of claim 13, wherein said support frame means for adjustably connecting to said second cross frame strut further comprises a U-bracket fixedly attachable to said second cross frame strut and a plurality of holes in spaced alignment through said support frame, and a bolt connecting said U-bracket to said support frame through any of said plurality of holes.

15. The apparatus of claim 14, wherein said at least one steering dampener further comprises two steering dampeners each having an end connected to said turning arm with said spindle intermediate said dampener connections.

16. The apparatus of claim 15, further comprising a coil spring having one end about said cylinder and having another end adjacent said turning arm.

17. The apparatus of claim 16, wherein said at least one wheel further comprises two wheels respectively mounted on opposite sides of said spindle.

18. The apparatus of claim 12, further comprising an air bag in said cylinder, and wherein the upper end of said spindle comprises a closed end.

19. The apparatus of claim 18, further comprising an air valve connected to said air bag and having an end projecting through said cylinder.

\* \* \* \* \*